(12) United States Patent
Müller

(10) Patent No.: US 6,572,173 B2
(45) Date of Patent: Jun. 3, 2003

(54) SUN SHIELD FOR VEHICLES

(76) Inventor: Hermann-Frank Müller, Lyngsbergstr. 3a, D-53177 Bonn (DE)

( * ) Notice: Subject to any disclaimer, the term of this patent is extended or adjusted under 35 U.S.C. 154(b) by 0 days.

(21) Appl. No.: 09/940,861

(22) Filed: Aug. 28, 2001

(65) Prior Publication Data

US 2002/0066539 A1 Jun. 6, 2002

(51) Int. Cl.⁷ .................................................. B60J 3/02
(52) U.S. Cl. ...................................... 296/97.2; 160/127
(58) Field of Search ....................... 160/370.21, 370.22, 160/370.23, 127, 98, 107; 296/97.5, 97.6, 97.8, 97.12, 97.1, 97.2; 136/245, 291

(56) References Cited

U.S. PATENT DOCUMENTS

| | | | | |
|---|---|---|---|---|
| 1,180,124 A | * | 4/1916 | Foedisch | |
| 4,636,579 A | * | 1/1987 | Hanak et al. | |
| 5,022,699 A | * | 6/1991 | Yoshida | |
| 5,076,634 A | * | 12/1991 | Muller et al. | |
| 5,133,585 A | * | 7/1992 | Hassan | |
| 5,433,259 A | * | 7/1995 | Faludy | |
| 5,569,520 A | | 10/1996 | Bates | |
| 6,012,757 A | | 1/2000 | Viertel et al. | |
| 6,318,788 B1 | * | 11/2001 | Jaurigue | |

* cited by examiner

Primary Examiner—Blair M. Johnson
(74) Attorney, Agent, or Firm—Gudrun E. Huckett

(57) ABSTRACT

A sun shield, having disengageable swivel bearing, rollable and flexible solar modules on a support material made of scrim tissue or taffeta with layer material to form a laminate, organic (OLED) or polymer (PLED) luminous diodes, has a small cross section in which for an enlargement of the solar surface the support material with thin-layer elements is arranged to be extended and retracted from the sun shield. A component which can be snapped in the opening on the back of the sun shield can be disengaged and used as a flashlight outside the vehicle.

20 Claims, 2 Drawing Sheets

SUN SHIELD FOR VEHICLES

BACKGROUND OF THE INVENTION

1. Field of the Invention

The invention refers to removable sun shields with solar modules to convert impinging light into electrical energy.

2. Description of the Prior Art

Such solar modules are described in DE 40 03 399 C2 and DE 198 55 258 A1. Solar modules which are applied to glass may cause additional injuries for vehicle occupants in case of a front-end collision. Gratings made of plastic for installing foam material for upholstery as well as flat component parts such as cosmetic mirrors and LEDs and/or LCDs for illumination make the sun shield relatively thick.

SUMMARY OF THE INVENTION

Therefore, it is the invention's objective to suggest a sun shield which—in addition to the already described utilization—is made slender even on the outside of the vehicle with a design which is optionally adjustable. The removable illuminated cosmetic mirror or the like can also be used as a flashlight for even a longer time period with the assistance of one solar cell. Furthermore, possible injuries in case of front-end collisions should be diminished.

To solve this task, a roller (6) is placed within the sun shield (1), several rollable thin-layer elements (7a) are affixed to a support material (7) with different functions such as solar cells (7aa) for energy generating and as energy storage elements (7ab) and the thin-layer elements (7a) can be extended and retracted from the roller (6).

In an alternative, within the sun shield (1)—on an extendable lamellar support material (7')—several rollable thin-layer elements (7a) are arranged with different functions such as solar cells (7aa) for energy generating and as energy storage elements (7ab).

Advantageous further developments the invention are described in the following with the aid of the drawing.

BRIEF DESCRIPTION OF THE DRAWINGS

The following drawings show the configuration of the invention, without confining the configuration to the shown embodiments. It is shown in.

DESCRIPTION OF PREFERRED EMBODIMENTS

Figure 1:
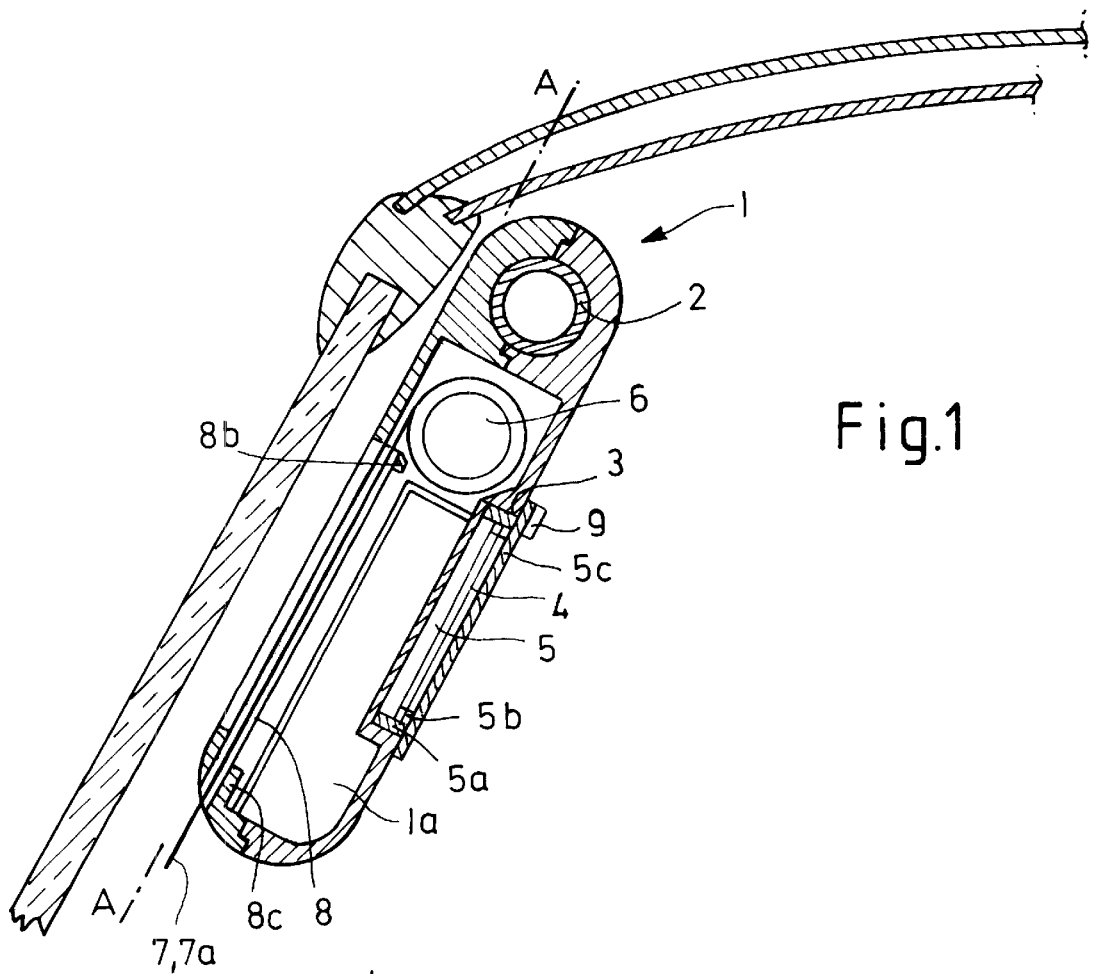
FIG. 1: a cross-sectional view of a sun shield with support material with thin-layer elements applied rolled up onto a roller.

The inventive sun shield (1)—according to FIG. 1—shows (as known from DE 4003 399 C2) a bar (2) at its upper longitudinal edge. The sun shield is swivelling around that bar (2) and is snapped into the vehicle ceiling at its bended end. Naturally, in this connection constructively altered swivel-and-snap-in variants are possible.

Figure 1A:
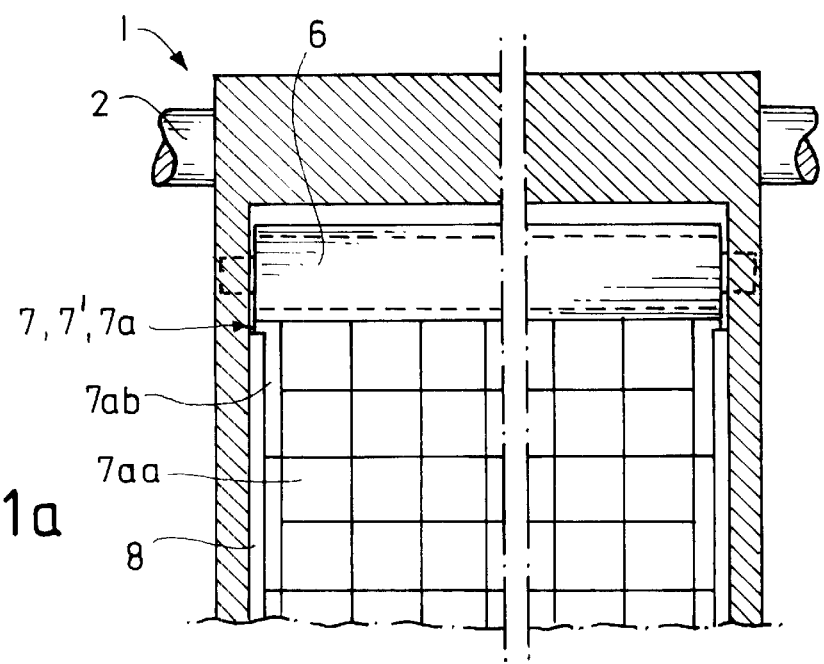
FIG. 1a: a sectional view of FIG. 1 as indicated by section line IA—IA in FIG. 1.

The sun shield—according to DE 40 03 399 C2—shows on its back side facing the vehicle interior an opening for installing batteries for storage of energy gained from the solar cells. The further development—according to DE 198 55 258 A1—refers to assign a planar component part for that opening such as an illuminated cosmetic mirror with a removable frame which can be used as a component unit together with integrated solar modules, battery(ies) and mini lamps on the vehicle exterior. The mirror can be used as a flashlight if necessary. This further developed sun shield consists of—in contrast to a sun shield according to U.S. Pat. No. 6,012,757—two housing parts, for example, connected with another with a snap lock in order to be able to exchange the existing component parts in the sun shield if necessary. All these described sun shields show a relatively thick sectional area. To reduce this cross-section a roller (6) is placed in the inventive sun shield (1) on which on a support material (7) a larger number of rollable thin-layer elements (7a) are arranged which can be extended and retracted. This is illustrated in FIG. 1a. These thin-layer elements (7a) serve as solar cells (7aa) for energy generation, as energy storing elements (7ab) for energy storage and if necessary as energy consumer. Thereby, it is left to the artisan in which way the various thin-layer elements (7a) are arranged, for example if they are arranged side-by-side or piled up in layers (as laminate) since it also depends on whether the sun shield (1) should generate more energy (for immediate consumption) or if it should store more energy for consumption outside the vehicle.

Figure 3:
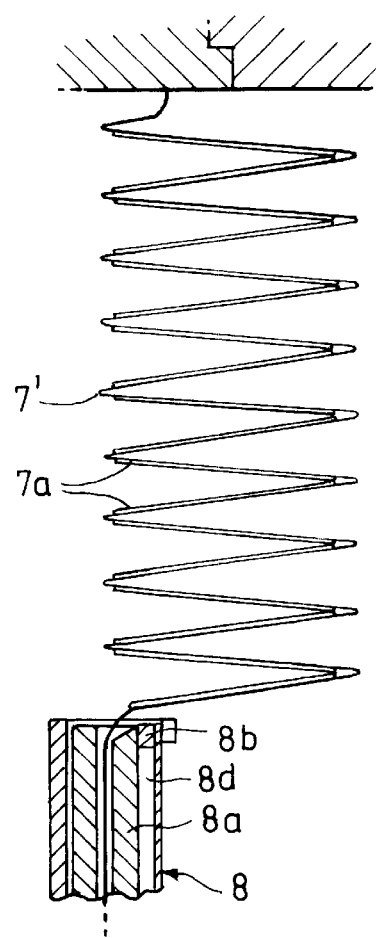
FIG. 3: support material with one-sided thin-layer elements applied—not to scale.

The extension and retraction of the support material (7) with the thin-layer elements (7a) onto the roller (6) can be performed mechanically in the described way via pull cords. Especially for an electrical or a hydraulic, e.g. pneumatic, operation which can also be performed automatically or in intervals, the support material (7) with thin-layer elements (7a) is connected at its both longitudinal sides with a telescopic guide rail (8); such a guide rail is schematically illustrated in more detail in FIG. 3 for an embodiment with a lamellar support (7') but the telescoping function is the same for both types of support materials (7, 7'). When being extended, the longitudinal sides of the support material (7, 7') are guided in the telescoping rail parts of the guide rail (8). Each single rail part (8a) is coupled with the respective integrated part of the support material (7) (laminate). Over at least one lateral projecting stop pin (8b) or a similar stop which is inserted in an interior slot (8d) of the encased adjacent rail part (8a) it is prevented that individual rail parts (8a) separate from another wherein this stop pin (8b) arrives at the stop which ends the slot (8d) picking up the adjacent rail part (8a). The number of rail parts (8a) depend on the desired end length of the support material (7) with thin-layer elements (7a). If the roller (6) is sufficiently fixed outside the opening (3) provided for the frame (5a) of the removable cosmetic mirror (4) or the like and the support material (7) with thin-layer elements is fixed to the roller (6) and practically does not use up much space within the sun shield (1), the thickness of the sun shield is limited to the depth of the required space for the frame (5a) of the cosmetic mirror (4). The sun shield may receive an upholstery made, for example, of foam material or another material to reduce the risk of injury of the vehicle occupants in case of a front-end collision. This is in case the space is not used for the cosmetic mirror frame (5a) as well as for the roller (6), eventually for its driving motor and a pump (if not enough space within the roller) and the support material (7) with thin-layer elements (7a) and its guide rail (8). If not used for other purposes the space can be used for an anti-static cleaning bar (not shown) diagonal to the material support material (7) with the thin-layer elements (7a). When extending and retracting it serves for cleaning purposes. Furthermore, the production of an "additional sun shield" which is connected with the sun shield according to DE 40 03 399 C2 is not necessary and its size—in contrast to the inventive sun shield with support material (7) and thin-layer elements (7a)—remains invariable.

Figure 2:
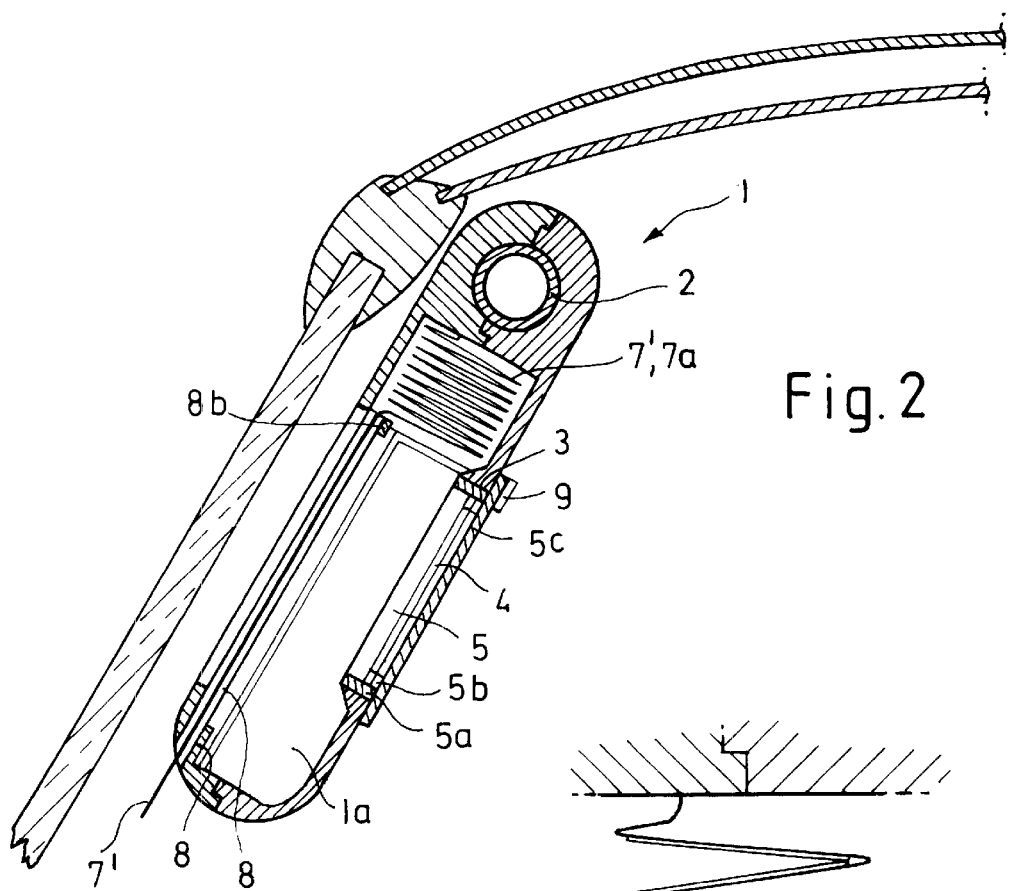
FIG. 2: a cross-sectional view of a sun shield with lamellar support material with one-sided thin-layer elements applied.

Instead of extending and retracting the support material (7) with thin-layer elements (7a) from the roller, it is possible—as shown in FIG. 2—to arrange the support material (7') with thin-layer elements (7a) lamellar within the sun shield (1), wherein the assigned space for the roller 6 for the lamellar support material (7') with thin-layer elements joined together with little space in between is provided. Even in this case the telescopic guide rails (8) perfectly secure—to both longitudinal sides of the support material (7) with thin-layer elements (7a)—the respective position in the same way as if using the roller (6). Instead of using glass for support material (7') for the lamellar configuration, a glass-like plastic or a plastic tissue can be used onto which the thin-layer elements are fixed and can be laminated onto the back side if necessary.

Newly developed thin-layer solar modules with monocrystalline or polycrystalline solar cells are selected for thin-layer elements (7a) for utilization within the sun shield. For example, a soft and flexible, non-woven scrim-tissue made of polyester or taffeta, a light tissue for laminate, can be used as a support material (7). If necessary, rechargeable lithium thin-film batteries (according to U.S. Pat. No. 5,569,520) can be fixed to the support material (7) for storage of electric energy generated in the solar cells. Furthermore, and if necessary, planar and flexible luminous diodes (OLED) or luminous diodes made of organic macro-molecules (PLED) may be assigned as (minimum) energy consumer. Their function is based on their self-illuminating characteristics.

The opening (3) on the back of the sun shield (1) in the pivoted-down position facing the vehicle interior accommodates—as component unit (5)—a frame (5a) which is disengageable from the opening (3) for accommodating a planar component (4) such as a cosmetic mirror or a flat screen—if necessary placed behind—or the like together with at least one thin-layer solar module with planar and flexible luminous diodes (5b) and with a thin-layer battery, e.g., a thin-film power condenser (according to U.S. Pat. No. 6,104,597) in order to be able to use thin component unit (5) as a flashlight outside the vehicle for a longer period of time. In order not to waste the stored energy the luminous diodes (5b) of the sun shied (1) are arranged disconnectably—alternatively individually—for example, by closing the sun shield lid (5c). It is left to the artisan, if the energy transmitting connection of individual solar modules e.g. solar module groups are directed by sectors to a thin-film battery or directed immediately to one or more thin-film power condensers of which at least one is assigned within the disengageable component unit (5). It does not matter whether the support material (7) or (7') for the thin-film elements (7a) can be extended and retracted on a roller (6) or placed in a lamellar arrangement within the sun shield (1) since this component unit (5) is independent and has contact with the solar modules on the support material (7) or (7') by snapping it into the opening (3). Especially for utilization of the disengageable component unit 5 as a flashlight, the plug junction (9) should be fixed at, for example, the sun shield lid (5c) in order to release energy to any energy consumers in and outside the vehicle, on the one hand, and, on the other hand, is able to release energy to the vehicle battery or extract energy from the vehicle battery in case at least the one thin-film power condenser is not charged with sufficient energy for utilization outside the vehicle.

The screen assigned within the component unit (5) can be used for receiving data via GMS or GPS technology integrated within the sun shield (1) and can be utilized in a taxi for short messages as luminous advertising, as telematic and the like. A digital CAD/CAM camera tapes pictures in order to enable a visual communication between at least two people. OLED and/or PLED screens with camera are UMTS-capable and result in a more rapid communication.

A magnetic data transfer for connecting at least two systems without electronic contact should be possible. If the space on the screen of the component unit (5) is not sufficient, the uncoupled digital switches can be transferred magnetically via a solar chip. The magnetic fields are transmitted and received by tiny coils placed within the chip.

Considering the artisan's wish for a "normal" look of the sun shield (1), the folded-down sun shield facing the direction of traffic can show a translucent foil within the solar module area with a coloration not impeding the light transmittance as described in DE 198 55 258 A 1.

The general electric switch system for a sun shield with solar cells (solar modules) is known to the artisan. It contains MPP (Maximum Power Point) control, return-current relay diode, switch, energy storage, converter for step-up-/step-down transformer for a DC-motor, e.g., as converter for rotary current and multiphase current, organic and polymer luminous diodes as energy consumer as well as load resistance in general.

The respective selection of the individual switch elements also depends on the amount of energy generated in the sun shield 1. It depends on the number of sun shields in the vehicle as well as the type and number of consumers, e.g., the disengageable component unit (5), on the utilization of the sun shield (1) outside the vehicle and whether the described thin-element technique should be used with at least one sun shield (1), but additionally also at the rear vehicle ceiling in order to increase energy generation for additional consumers such as an electrolyzer or a fuel cell.

The described technology for a sun shield can be applied not only to vehicles of all types but also—when respectively reconfigured—for example, to trains, ships and airplanes. A lamellar fuel cell, preferably a lamellar diaphragm fuel cell, provides energy from a hydrogen cartridge supplementing the energy storage with additional electricity when the electricity generated from the solar cells is tight in case of maximum-demand times.

What I claim is:

1. A swivelable and disengageable sun shield (1) for a vehicle, the sun shield comprising:
   an opening (3) and at least one planar component (5) arranged in the opening (3), wherein the at least one planar component (5), when the sun shield is folded down, faces an interior of a vehicle;
   a roller (6) arranged within the sun shield (1);
   a support material (7) connected with a first end to the roller (6) so as to be extendable and retractable;
   several rollable thin-layer elements (7a) connected to the support material (7);
   the thin-layer elements (7a) comprising solar cells (7aa) for generating energy and at least one energy storing element (7ab) for storing the energy generated by the solar cells;
   a plug junction (9) connected to the at least one energy storing element for withdrawing the energy stored in the at least one energy storing element (7ab).

2. The sun shield according to claim 1, further comprising telescoping guide rails (8) fixed with non-extendable ends to an inner wall of the sun shield and having free ends opposite the non-extendable end, wherein a second end of the support material (7) opposite the first end of the support material is connected at both longitudinal sides of the support material (7) to the free ends of the telescopic guide rails (8), wherein the guide rails (8) are configured to extend and retract the support material (7; 7') when actuated.

3. The sun shield according to claim 1, wherein the support material (7) is made of scrim tissue or taffeta and the thin-layer elements are arranged on one side or both sides.

4. The sun shield according to claim 1, wherein the at least one planar component arranged in the opening (3) of the sun shield (1) comprises at least one of a cosmetic mirror and a screen.

5. The sun shield according to claim 4, wherein the at least one planar component further comprises at least one thin-layer solar cell.

6. The sun shield according to claim 4, wherein at least one collective storage is used for storing the energy generated in the solar cells of the support material and of the at least one planar component.

7. The sun shield according to claim 5, further comprising planar and flexible, switchable luminous diodes (5b) and a thin-layer battery for using the at least one planar component as a flashlight.

8. The sun shield according to claim 4, wherein the at least one planar component is configured to receive data via GMS or GPS technology.

9. The sun shield according to claim 4, wherein the screen is configured to display short messages, luminous advertising, or images produced by a camera.

10. The sun shield according to claim 1, wherein the at least one energy storing element is in the form of rollable micro miniature batteries or rollable thin-film batteries.

11. A swivelable and disengageable sun shield (1) for a vehicle, the sun shield comprising:

an opening (3) and at least one planar component (5) arranged in the opening (3), wherein the at least one planar component (5), when the sun shield is folded down, faces an interior of a vehicle;

an extendable lamellar support material (7') connected with a first end to an interior wall of the sun shield so as to be extendable and retractable;

several rollable thin-layer elements (7a) connected to the support material (7');

the thin-layer elements (7a) comprising solar cells (7aa) for generating energy and at least one energy storing element (7ab) for storing the energy generated by the solar cells;

a plug junction connected to the at least one energy storing element for withdrawing the energy stored in the at least on energy storing element (7ab).

12. The sun shield according to claim 11, further comprising telescoping guide rails (8) fixed with non-extendable ends to an inner wall of the sun shield and having free ends opposite the non-extendable end, wherein a second end of the support material (7') opposite the first end of the support material is connected at both longitudinal sides of the support material (7') to the free ends of the telescopic guide rails (8), wherein the guide rails (8) are configured to extend and retract the support material (7; 7') when actuated.

13. The sun shield according to claim 11, wherein the support material (7) is made of scrim tissue or taffeta and the thin-layer elements are arranged on one side or both sides of the support material (7').

14. The sun shield according to claim 12, wherein the at least one planar component arranged in the opening (3) of the sun shield (1) comprises at least one of a cosmetic mirror and a screen.

15. The sun shield according to claim 14, wherein the at least one planar component further comprises at least one thin-layer solar cell.

16. The sun shield according to claim 14, wherein at least one collective storage is used for storing the energy generated in the solar cells of the support material and of the at least one planar component.

17. The sun shield according to claim 15, further comprising planar and flexible, switchable luminous diodes (5b) and a thin-layer battery for using the at least one planar component as a flashlight.

18. The sun shield according to claim 14, wherein the at least one planar component is configured to receive data via GMS or GPS technology.

19. The sun shield according to claim 14, wherein the screen is configured to display short messages, luminous advertising, or images produced by a camera.

20. The sun shield according to claim 19, wherein the at least one energy storing element is in the form of rollable micro miniature batteries or rollable thin-film batteries.

* * * * *